United States Patent Office 2,770,621
Patented Nov. 13, 1956

2,770,621

PROCESS FOR THE PREPARATION OF 2-AMINO-4,6-DIPHENOXY-S-TRIAZINE

John A. Sherred, St. Louis, Mo., assignor to Monsanto Chemical Company, St. Louis, Mo., a corporation of Delaware No Drawing. Application December 21, 1954, Serial No. 476,853

3 Claims. (Cl. 260—249.5)

This invention relates to 2-amino-4,6-diphenoxy-s-triazine and more particularly to a method for its preparation.

2-amino-4,6-diphenoxy-s-triazine has utility in the preparation of various types of synthetic resins. The processes heretofore used for its preparation have not proven too satisfactory from a commercial standpoint since these processes result in the production of significant quantities of undesirable by-products.

An object of this invention is to provide an exceptionally simple process for the production of 2-amino-4,6-diphenoxy-s-triazine. Other objects will become apparent from the description of the process.

It has now been discovered that 2-amino-4,6-diphenoxy-s-triazine can be prepared in significantly high yields by the reaction of molten 2,4,6-triphenoxy-s-triazine with gaseous ammonia. The reaction is best carried out by bubbling gaseous ammonia through molten 2,4,6-triphenoxy-s-triazine at substantially atmospheric pressure. Some variation in the temperature of the reaction mixture is permissible but the molten 2,4,6-triphenoxy-s-triazine is preferably maintained initially at a temperature between its melting point (234°–236° C.) and below about 245° C. After the reaction has started, the reaction mixture can be cooled to a temperature below the melting point of 2,4,6-triphenoxy-s-triazine, even to a temperature as low as 200° C., and the reaction mixture retained in a molten state. Higher temperatures tend to cause polymerization. The quantity of reactants used can be varied substantially. Ammonia is preferably employed in excess. After the reaction is complete, 2-amino-4,6-diphenoxy-s-triazine can be recovered in any convenient manner.

The following example is illustrative of the process of this invention:

Four grams of 2,4,6-triphenoxy-s-triazine were melted in a suitable container and maintained at a temperature of approximately 237° C. Gaseous ammonia was then bubbled through the 2,4,6-triphenoxy-s-triazine at a rate of 12 ml./min. until 1.5 liters of ammonia had been used. The reaction mass was then cooled and dissolved in dioxane. Crystallization of 2-amino-4,6-diphenoxy-s-triazine from the dioxane solution yielded 2.6 grams of product, representing a yield of 87% based on 2,4,6-triphenoxy-s-triazine. The product was recrystallized from dioxane and the purified product thus obtained was a white crystalline material having a melting point of 170°–175° C.

What is claimed is:

1. A process for the preparation of 2-amino-4,6-diphenoxy-s-triazine which comprises reacting molten 2,4,6-triphenoxy-s-triazine with gaseous ammonia at substantially atmospheric pressure.

2. A process for the preparation of 2-amino-4,6-diphenoxy-s-triazine which comprises passing gaseous ammonia through molten 2,4,6-triphenoxy-s-triazine at substantially atmospheric pressure.

3. A process for the preparation of 2-amino-4,6-diphenoxy-s-triazine which comprises passing gaseous ammonia through molten 2,4,6-triphenoxy-s-triazine at substantially atmospheric pressure and at a temperature of below about 245° C. and recovering 2-amino-4,6-diphenoxy-s-triazine.

References Cited in the file of this patent

UNITED STATES PATENTS 2,545,049 Schaefer _____ Mar. 13, 1951